United States Patent [19]

Katsuki

[11] Patent Number: 6,079,219
[45] Date of Patent: Jun. 27, 2000

[54] AIR CONDITIONER

[75] Inventor: Hikaru Katsuki, Gunma-ken, Japan

[73] Assignee: Sanyo Electric Co., Ltd., Ohsaka-fu, Japan

[21] Appl. No.: 09/280,910

[22] Filed: Mar. 29, 1999

[30] Foreign Application Priority Data

Mar. 31, 1998 [JP] Japan ................................. 10-087735

[51] Int. Cl.⁷ ...................................................... F24F 1/00
[52] U.S. Cl. .............................. 62/180; 62/157; 62/186; 236/DIG. 9
[58] Field of Search ....................... 236/35, 38, DIG. 19, 236/DIG. 9, 46 R, 46 F; 62/157, 158, 231, 186, 229, 180; 165/287, 299, 300; 374/141, 147, 148

[56] References Cited

U.S. PATENT DOCUMENTS

| 3,621,669 | 11/1971 | Nichols et al. | 62/157 |
| 3,635,044 | 1/1972 | Heth | 62/157 |
| 4,075,864 | 2/1978 | Schrader | 62/180 |
| 4,109,482 | 8/1978 | Pearson | 62/180 |

Primary Examiner—Harry B. Tanner
Attorney, Agent, or Firm—Knobbe, Martens, Olson & Bear, LLP

[57] ABSTRACT

A fan motor is run at minimum capability at predetermined time intervals for a certain period of time when a heating mode is set but a blowing is stopped. Thus, with air around a temperature sensor disposed between inlet openings and a heat exchanger being not affected by the heat of the heat exchanger, measurement of a room temperature is carried out by the temperature sensor.

8 Claims, 6 Drawing Sheets

AIR CONDITIONER

This application claims priority under 35 U.S.C. § 119 for Japanese Application No. 10-87735, filed Mar. 31, 1998.

BACKGROUND OF THE INVENTION

1. Field of the Invention

The present invention relates to an air conditioner, and more particularly, to an air conditioner wherein a temperature sensor for detecting a room temperature is provided between a heat exchanger and inlet openings of an interior unit.

2. Background of the Related Art

Among air conditioners for effecting air-conditioning of an interior of a room, what is called a constant speed type circulates refrigerant while rotating a compressor at a constant rotational frequency. Further, one type of the air conditioners is called a separate type, which is divided into an interior unit installed in the inside of the room and an exterior unit installed in the outside of the room.

Some of the separate type air conditioners are provided with a temperature sensor near inlet openings of the interior unit so that a temperature of the interior air drawn in from the inlet openings is detected as a room temperature.

A constant speed type air conditioner effects an on/off of the compressor based on the temperature difference between the room temperature detected by the temperature sensor and the set temperature. In other words, when the room temperature become substantially equal to the set temperature, the compressor is turned off.

In the meantime, when the temperature sensor is provided near the inlet openings of the interior unit, the stop of a cross flow fan allows the temperature that is detected by the temperature sensor to be affected by the temperature of the heat exchanger. In other words, during a heating, air near the heat exchanger is heated by the heat exchanger, resulting in the rise in the air temperature near the inlet openings by convection. This causes the temperature around the temperature sensor provided near the inlet openings to become higher than the actual room temperature, thereby increasing an error of the room temperature detected by the temperature sensor.

For this reason, when the compressor is turned off because the room temperature becomes substantially equal to the set temperature, the cross flow fan is run so that a breeze is blown out from the interior unit. Thus, an exact room temperature can always be detected by the temperature sensor.

However, the run of the cross flow fan while the compressor is in a power-off state causes the tempe heat exchanger to drop gradually. Accordingly, there is a drawback in that a feeling of coldness is generated by the air blown out from the interior unit.

SUMMARY OF THE INVENTION

With the aforementioned in view, an object of the present invention is to provide an air conditioner which does not generate a feeling of coldness in the air even when a run of a blowing means is the stopped and is able to detect a room temperature appropriately, when a temperature sensor is provided near inlet openings for measuring the room temperature.

A first aspect of the present invention is an air conditioner for controlling air by a heat exchanger when the air drawn in from inlet openings is blown out from a blowout opening by a blowing means, comprising a temperature sensor disposed between said inlet openings and said heat exchanger, a blow control means for blowing out a predetermined amount of air from the blowout opening by said blowing means, and a room temperature measuring means for measuring a room temperature by said temperature sensor during a run of said blowing means, and for measuring the room temperature by said temperature sensor with the blowing means being run at minimum capability at predetermined time intervals when the run of said blowing means is stopped by said blowing control means.

According to the present invention, the blowing means is run at the predetermined time intervals by the room temperature measuring means when the run of the blowing means is stopped by the blow control means. In other words, the blowing means is run intermittently at the predetermined time intervals.

This prevents the measurement of the temperature by the temperature sensor with the air around the temperature sensor provided near the inlet openings being affected by the heat of the heat exchanger, thereby enabling the measurement of the appropriate room temperature.

At this time, even when the compressor is in a power-off state, the blowing means run at minimum capability prevents the air blowing out from the blowout opening during the heating from being felt as a cold air and the air blowing out during the cooling from being felt as a warm air. The blowing means may be intermittently run at any time intervals, yet preferably, the running time of the blowing means is kept minimum.

In the air conditioner of the present invention, it is preferable that said blowing means is run at the predetermined time intervals by said room temperature measuring means during the heating.

According to the present invention, the blowing means is run intermittently while the blowing means is stopped during the heating. In a wall-mounted air conditioner having inlet openings situated substantially above the heat exchanger, the temperature sensor is less likely to be affected by the heat of the heat exchanger during the cooling when the temperature of the heat exchanger is lowered.

Contrary to this, the temperature sensor is affected by the heat exchanger during the heating. It is for this reason that the blowing means is intermittently run when the blowing means is stopped during the heating.

In the air conditioner of the present invention, it is preferable that said room temperature measuring means runs said blowing means at the predetermined time intervals and detects the room temperature by said temperature sensor immediately after the stop of said blowing means.

According to the present invention, the room temperature is measured by the temperature sensor after the blowing means, which is intermittently run, is stopped. Though it depends on the period for which the blowing means is run, in the case where the blowing means is run for a short period of time, the influence of the heat exchanger is smaller immediately after the stop of the run of the blowing means than during the run of the blowing means. Therefore, more appropriate room temperature can be measured after the stop of the run of the blowing means.

DESCRIPTION OF THE PREFERRED EMBODIMENTS

An embodiment of the present invention will be described hereinafter with reference to the accompanying drawings.

Figure 1:
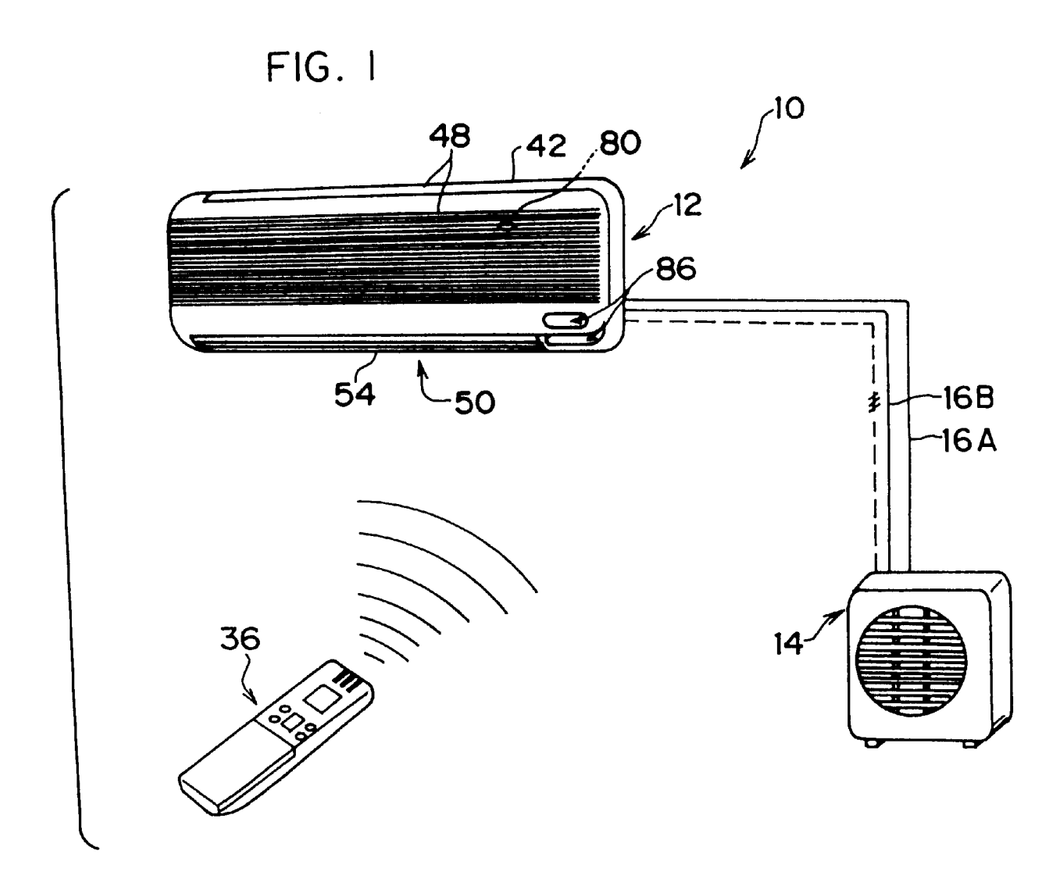
FIG. 1 is a schematic structural view of an air conditioner applied to the present embodiment.

As shown in FIG. 1, an air conditioner 10 applied to the present embodiment is a separate type divided into an interior unit 12 installed in the interior of a room to be air-conditioned and an exterior unit 14 installed in the exterior of the room. The air conditioner 10 effects an air-conditioning as the interior unit 12 controls the exterior unit 14 in accordance with the running conditions such as a run mode, a set temperature, and the like set by a run of a remote control switch 36.

Figure 2:
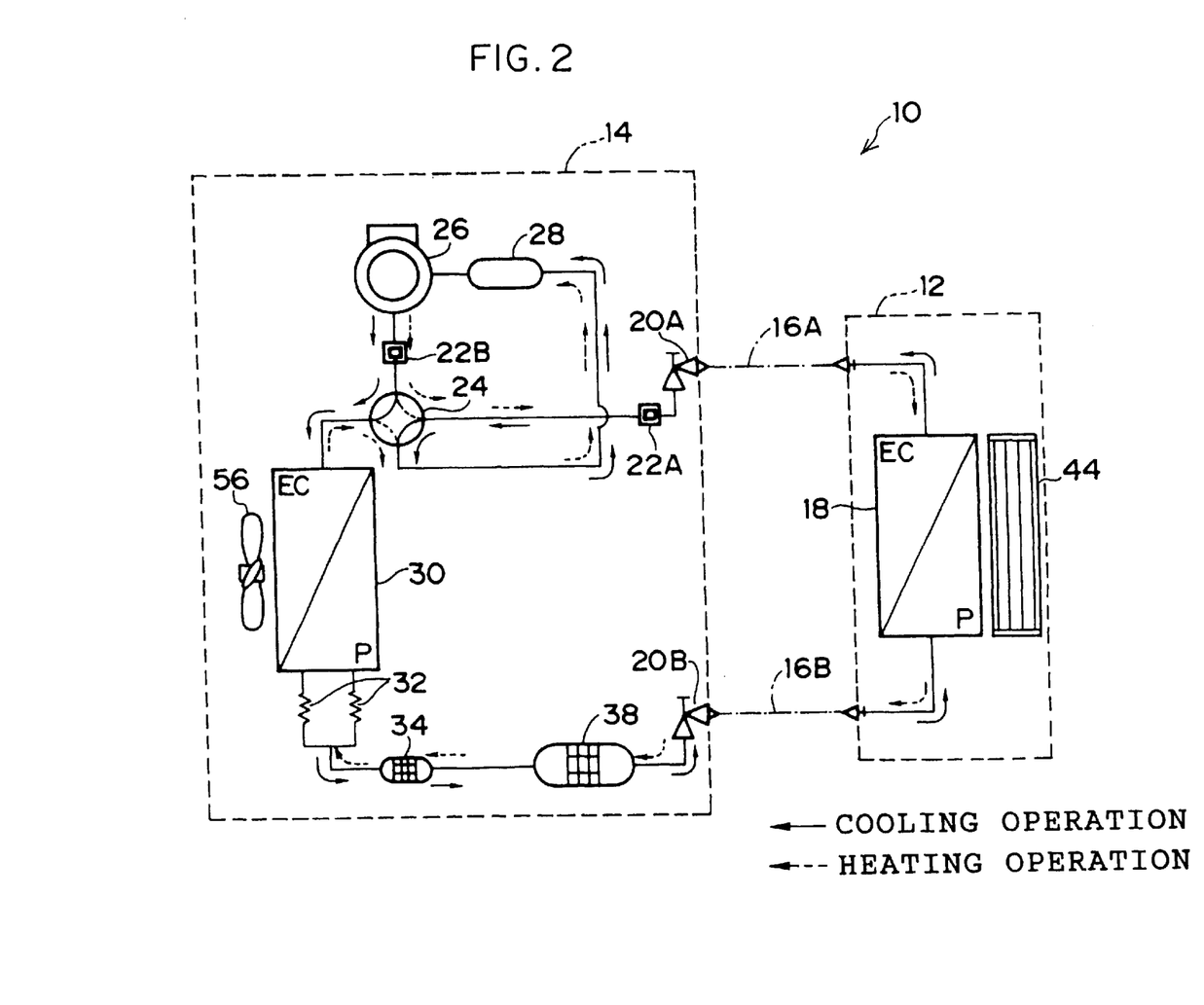
FIG. 2 is a schematic structural view illustrating a refrigerating cycle of an air conditioner applied to the present embodiment.

FIG. 2 shows an outline of a refrigerating cycle structured between the interior unit 12 and the exterior unit 14 of the air conditioner 10. Between the interior unit 12 and the exterior unit 14, a wide refrigerant piping 16A and a narrow refrigerant piping 16B are provided as a pair for circulating refrigerant. Respective ones of ends of the refrigerant pipings 16A and 16B are connected to a heat exchanger 18 provided in the interior unit 12.

The other end of the refrigerant piping 16A is connected to a valve 20A of the exterior unit 14. The valve 20A is connected to a four-way valve 24 via a muffler 22A. An accumulator 28 and a muffler 22B, each of which is connected to a compressor 26, are connected to the four-way valve 24. Further, a heat exchanger 30 is provided in the exterior unit 14. One end of the heat exchanger 30 is connected to the four-way valve 24, and the other end is connected to a valve 20B via a capillary tube 32, a strainer 34, and a modulator 38. The other end of the refrigerant piping 16B is connected to the valve 20B. In this way, a closed refrigerant circulation path forming a refrigerating cycle between the interior unit 12 and the exterior unit 14 is structured.

In the air conditioner 10, the run mode can be switched to a cooling mode (a dry mode)or a heating mode by switching the four-way valve 24. Respective flows of the refrigerant in the cooling mode (cooling) and the heating mode (heating) are indicated by arrows in FIG. 2.

Figure 3:
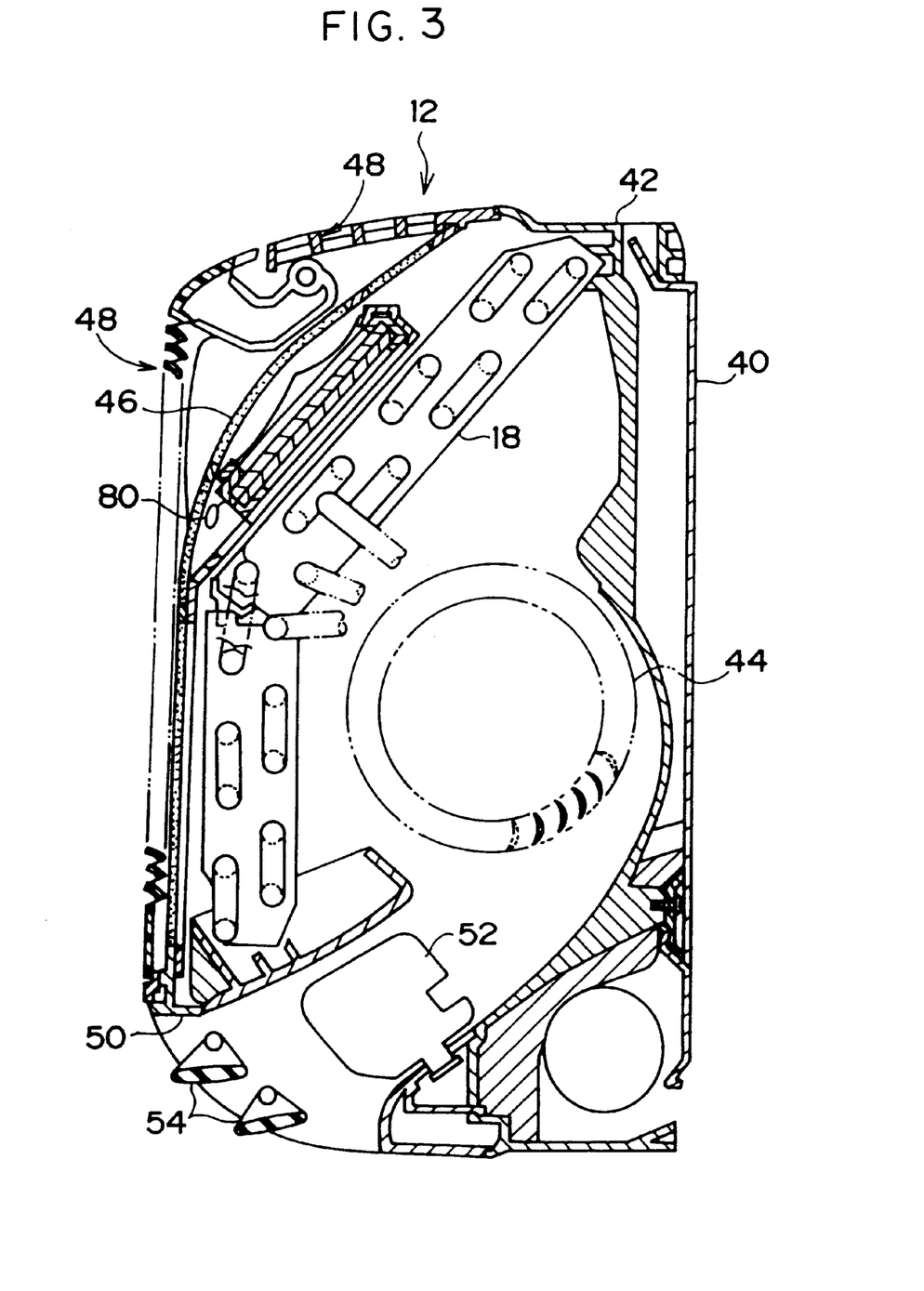
FIG. 3 is a schematic view illustrating an example of an interior structure of an interior unit of an air conditioner.

FIG. 3 shows an schematic sectional view of the interior unit 12. The interior portion of the interior unit 12 is covered by a casing 42 which is secured at the upper portion and the lower portion of an mounting base 40 (the page space above and below in FIG. 3) mounted on a wall of the interior of the room (not shown). A cross flow fan 44 is disposed at the central portion of the casing 42. The heat exchanger 18 is disposed stretching from the front side to the top side of the cross flow fan 44. A filter 46 is disposed between the heat exchanger 18 and inlet openings 48 which are formed from the front side to the top side of the casing 42. A blowout opening 50 is formed at the lower portion of the casing 42.

Thus, in the interior unit 12, the rotation of the cross flow fan 44 causes the interior air to be drawn in from the inlet openings 48, and be blown out from the blowout opening 50 into the interior of the room after passing the filter 46 and the heat exchanger 18. When the air passes the heat exchanger 18 of the refrigerating cycle, it is heated or cooled by exchanging heat with the refrigerant. Then, the air is blown out as an air-conditioned air from the blowout opening 50 so that air-conditioning of the room is effected.

Within the blowout opening 50, a transverse vane 52 and a horizontal flap 54 are provided so that the direction in which an air-conditioned air blown out from the blowout opening 50 can be adjusted.

As shown in FIG. 2, a cooling fan 56 is provided in the exterior unit 14 so that the heat exchanger 30 is cooled by the cooling fan 56 when the temperature of the heat exchanger 30 is raised during the cooling, thereby preventing decrease in the compressing efficiency of the refrigerant.

Figure 4:
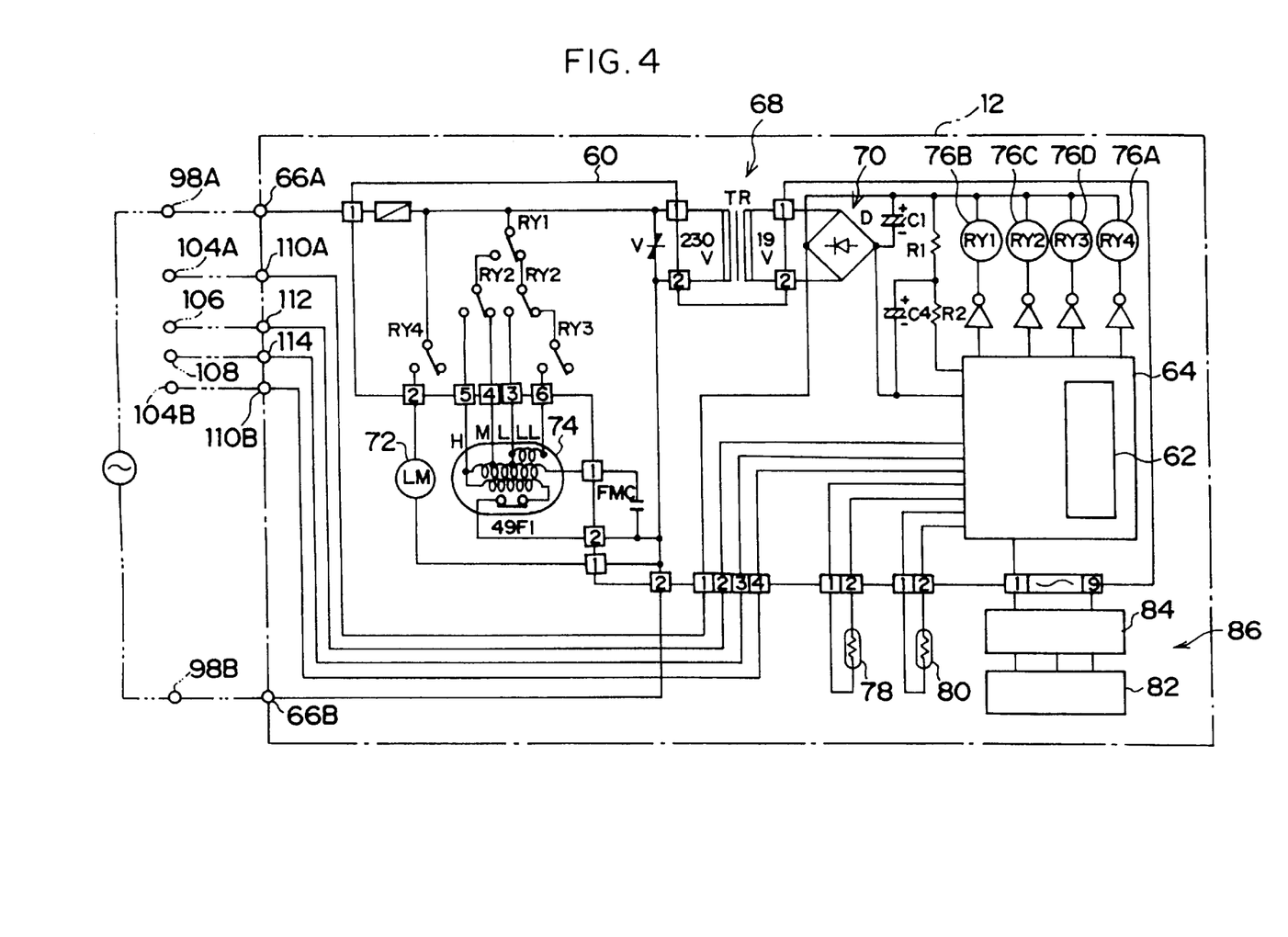
FIG. 4 is a schematic structural view illustrating a control board of an interior unit.

As shown in FIG. 4, a control circuit 64 equipped with a microcomputer 62 is provided on a control board 60 of the interior unit 12. Alternating current power is supplied to the control board 60 via terminals 66A and 66B. After transformed by a power transformer 68, the alternating current power is rectified by a diode 70 so that a predetermined voltage of direct current (for example, DC 24V) is supplied to the control circuit 64.

A louver motor 72 for adjusting the direction of a horizontal flap 54 and a fan motor 74 for driving the cross flow fan 44 are connected to the control board 60. A relay 76A for turning on/off the louver motor 72 and relays 76B, 76C and 76D for driving the fan motor 74 are connected to the control circuit 64.

The microcomputer 62 of the control circuit 64 adjusts the direction of the horizontal flap 54 and swings the horizontal flap 54 by driving the louver motor 72 with an on/off of the relay 76A. The microcomputer 62 of the control circuit 64 also controls the run/suspension and the rotational frequency of the cross flow fan 44 phasingly by switching on/off the relays 76B through 76D. Thus, the rotational frequency of the cross flow fan 44 is controlled in accordance with the four levels, i.e. LL (a breeze), L (a light wind), M (a medium wind), and H (a high wind), thereby allowing the amount of blown-out air (wind velocity) to be changed in accordance with the four levels from a breeze with a minimum amount of air to a high wind with a maximum amount of air.

On the other hand, a heat exchanger temperature sensor 78 for detecting the temperature of the heat exchanger 18 and a room temperature sensor 80 for detecting the temperature of the air drawn in from the inlet openings 48 as a room temperature are provided in the interior unit 12. The heat exchanger temperature sensor 78 and the room temperature sensor 80 are connected to the control circuit 64.

A display portion 86 equipped with a receiving board 82 for receiving a run signal from the remote control switch 36 and a switch board 84 is provided in the interior unit 12. The switch board 84 of the display portion 86 is connected to the control circuit 64.

As shown in FIG. 1, the display portion 86 is provided in the casing 42 of the interior unit 12. The run signal transmitted from the remote control switch 36 as an infrared signal is received and inputted to the control circuit 64 by running the remote control switch 36 toward the display portion 86. A run switching switch and various indication lamps using LED, etc. are provided on the switch board 84, thereby giving indications such as the indication of the run (not shown).

Figure 5:
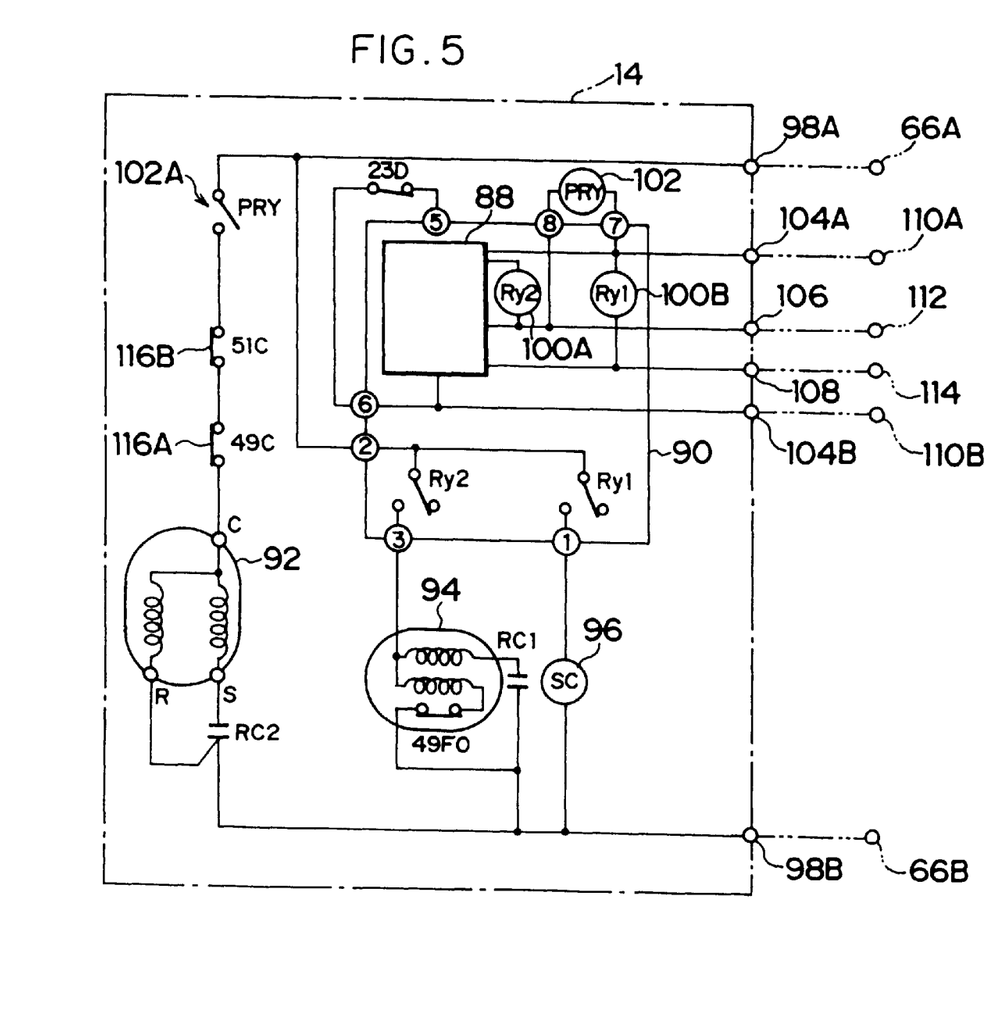
FIG. 5 is a schematic structural view illustrating a control board of an exterior unit.

On the other hand, as shown in FIG. 5, a control board 90 on which a control circuit 88 is provided, a compressor motor 92 for driving the compressor 26, a fan motor 94 for revolving the cooling fan 56, and a solenoid 96 for switching the four-way valve 24 are provided in the exterior unit 14.

Alternating current power for running the compressor motor 92 is supplied to the exterior unit 14 by connecting terminals 98A and 98B to the terminals 66A and 66B of the interior unit 12. The compressor motor 92 drives the compressor 26 at a constant speed with the alternative current power.

A relay 100A for driving the fan motor 94 and a relay 100B for driving the solenoid 96 are provided in the control circuit 88 and a power relay 102 for driving the compressor motor 92 is connected to the control circuit 88. The compressor motor 92 is driven when the power relay 102 is turned on and a contact point 102A is closed, and the fan motor 94 is driven when the relay 100A is turned on by the control circuit 88. The solenoid 96 switches the four-way valve 24 in accordance with the on/off of the relay 100B.

The exterior unit 14 is connected to the control board 60 of the interior unit 12 via terminals 104A, 104B, 106 and 108. As shown in FIG. 4, terminals 110A, 110B, 112 and 114 that are connected to the terminals 104A through 108 of the interior unit 14 are provided in the interior unit 12, each of which is connected to the control board 60.

Direct current voltage (for example, DC 24V) is applied between the terminals 110A and 110B. Thus, as shown in FIG. 4, electric power for run is supplied from the control board 60 of the interior unit 12 to the control board 90 of the exterior unit 14.

Further, as shown in FIG. 4, the terminals 112 and 114 are connected to the control circuit 64, respectively. As shown in FIG. 5, the terminal 112 is connected to the power relay 102 and the control circuit 88 via the terminal 106 of the exterior unit 14, and the terminal 114 is connected to the relay 100B and the control circuit 88 via the terminal 108.

Thus, the control circuit 64 of the interior unit 12 not only controls the on/off of the power relay 102 and the relay 100B of the interior unit 14, in other words, the run/stop of the compressor motor 92 and the switching of the four-way valve 24 but inputs the control state to the control circuit 88.

The microcomputer 62 of the interior unit 12 not only controls the solenoid 96 in accordance with the run mode of the air conditioner 10 but controls the run/suspension of the compressor motor 92 in accordance with the kinetic capability so that desired air-conditioned air is blown out from the blowout opening 50 of the interior unit 12 for effecting air-conditioning of the interior of the room. For example, when the temperature difference between the interior temperature and the set temperature is wide, the compressor motor 92 is turned on. When the interior temperature becomes substantially equal to the set temperature, the compressor motor 92 is turned off.

On the other hand, contact points 116A and 116B are provided between the contact point 102A of the power relay 102 and the compressor motor 92 in the exterior unit 14. These contact points 116A and 116B are opened and closed by an unillustrated relay provided in the control circuit 88. These contact points 116A and 116B are usually closed so that current can be carried to the compressor motor 92. When the control circuit 88 detects overload of the compressor motor 92 by an unillustrated detection means, the contact point 116A is opened. When the control circuit 88 detects the outside air temperature being greatly lowered by an unillustrated outside air temperature sensor, the contact point 116B is opened. When the contact point 116A or the contact point 116B is opened, the compressor motor 92 stops driving and is protected even when the power relay 102 is still in a power-on state.

The overload of the compressor motor 92 and the outside air temperature can be detected by utilizing conventional techniques of the prior art, whose detailed explanation will be omitted in the present embodiment.

As shown in FIGS. 1 and 3, the temperature sensor 80 of the interior unit 12 is disposed between the inlet openings 48 and the heat exchanger 18 so that the temperature of the air drawn in from the inlet openings 48 into the casing 42 by the cross flow fan 44 can be detected.

The microcomputer 62 provided in the control circuit 64 of the interior unit 12 reads the temperature detected by the room temperature sensor 80 as a room temperature, sets air-conditioning capability on the basis of the temperature difference between the set temperature which is set by the remote control switch 36 and the room temperature, etc., and controls the on/off of the compressor 26 and the on/off and the rotational frequency of the fan motor 74 on the basis of the set air-conditioning capability.

On the other hand, the microcomputer 62 of the interior unit 12 detects the temperature of the heat exchanger 18, which is heated or cooled by the run of the compressor 26, with the heat exchanger temperature sensor 78, and stops the fan motor 74 when required. For example, the microcomputer 62 stops the fan motor 74 until the temperature of the heat exchanger 18 mounts to a predetermined temperature (for example, 25° C.) during the heating. Further, the microcomputer 62 limits the blowing to a minimum air amount (LL) until the temperature of the heat exchanger 18 mounts to the temperature that is enough to obtain the appropriate heating capability (for example, 35° C.).

Thus, at the beginning of the heating, cold air or a large quantity of relatively cold air is not blown out from the blowout opening 50 of the interior unit 12, which otherwise not only hinders a heating effect but produces a cooling effect.

Further, the microcomputer 62 of the interior unit 12 turns off the compressor 26 when the room temperature becomes substantially equal to the set temperature. At the same time, the cross flow fan 44 is stopped.

In the mean time, the microcomputer 62 of the interior unit 12 carries out the detection of the room temperature by the room temperature sensor 80 even while the cross flow fan 44 (the fan motor 74) is stopped. At this time, as air is not drawn in from the inlet openings 48 with the stop of the cross flow fan 44, the temperature of the air around the room temperature sensor 80 may be changed gradually affected by the heat of the heat exchanger 18.

Particularly during the heating, as the temperature of the heat exchanger 18 is relatively high and the room temperature sensor 80 is disposed substantially above the heat exchanger 18, the temperature of the air around the room temperature sensor 80 is gradually increased by convection. For this reason, the temperature detected by the room temperature sensor 80 may differ widely from the room temperature.

In order to prevent this, the blowing of the cross flow fan 44 needs to be continued without stopping. However, the continuous blowing by the cross flow fan while the compressor 26 is stopped causes the temperature of the heat exchanger 18 to drop gradually, resulting in a cold feeling in the air though the heating is effected.

Contrary to this, in the present embodiment, appropriate room temperature can be detected by the room temperature sensor 80 without generating a feeling of coldness in the air or the like when the compressor 26 is stopped.

Figure 6:
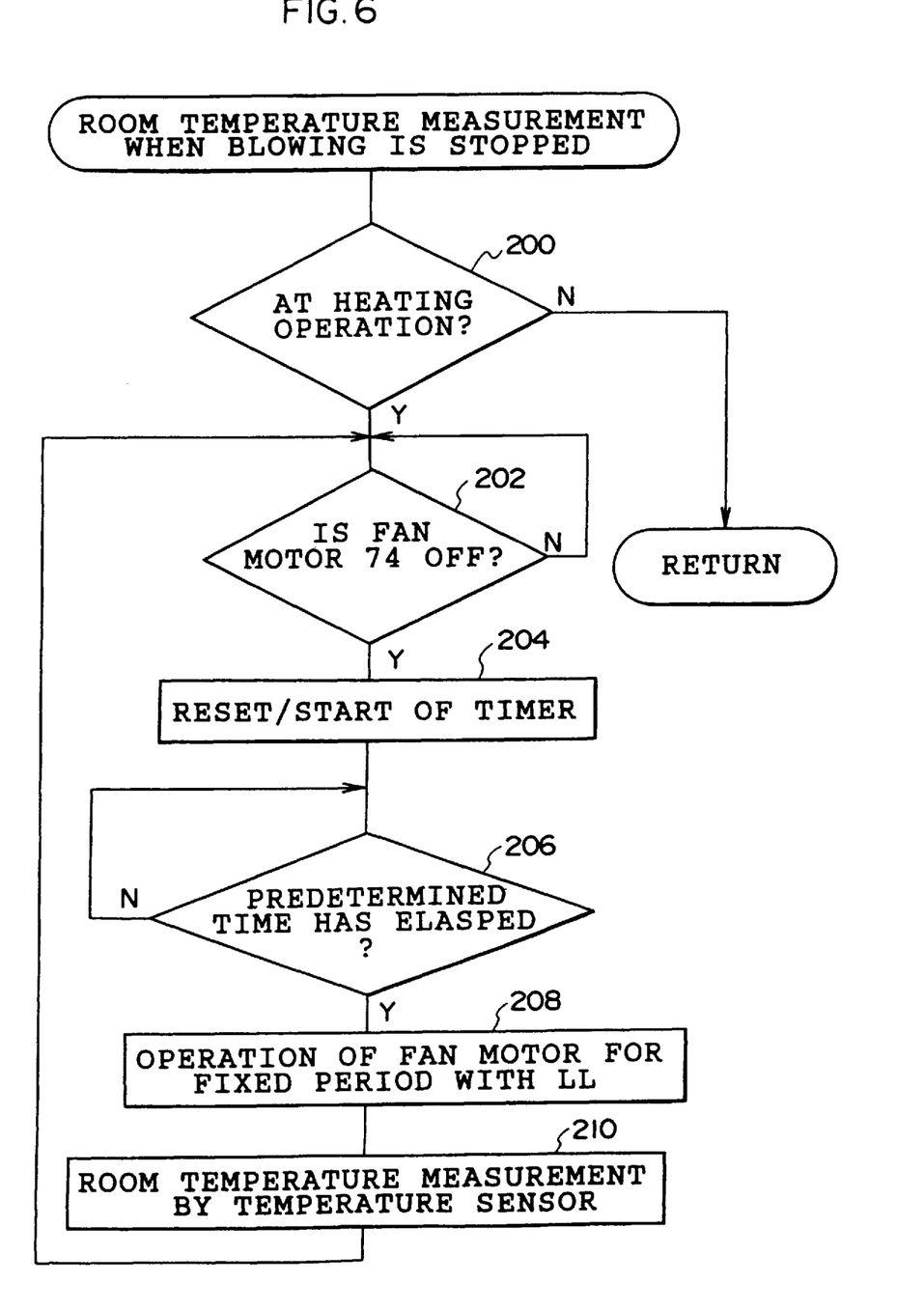
FIG. 6 is a flow chart illustrating an example of measurement of a room temperature when a blowing is stopped.

As run of the present embodiment, detection of the room temperature when the blowing is stopped will be explained hereinafter with reference to a flow chart shown in FIG. 6. The flow chart shown in FIG. 6 is started when an air-conditioning by the air conditioner 10 is effected, and is terminated when the air-conditioning is halted.

In the first step of the flow chart, i.e. step 200, a determination is made as to whether the air conditioner 10 is set at a heating mode. If it is set at the heating mode (the answer to the determination in step 200 is "Yes"), the process moves to step 202 where a determination is made as to whether the fan motor 74 is stopped. In other words, in step 202, a determination is made as to whether the cross flow fan 44 of the interior unit 12 is run so that the interior air is drawn in from the inlet openings 48.

At this time, if the fan motor 74 is stopped (the answer to the determination in step 202 is "Yes"), the process moves to step 204 where a timer for measuring the stop time is reset/started so as to determine in the subsequent step 206 whether or not the time measured by the timer mounts to a predetermined period of time (for example 30 seconds).

Thus, if the predetermined time has elapsed after the stop of the fan motor 74, the answer to the determination in step 206 is "Yes" and the process moves to step 208. In step 208, the fan motor 74 is driven for a predetermined period of time (for example, 5 seconds) with a minimum amount of air, i.e. LL (only the relay 76D is turned on in FIG. 4).

Thus, the cross flow fan 44 revolves in such a way that the interior air is drawn in from the inlet openings 48 and the air around the room temperature sensor 80 is replaced with the air drawn in from the inlet openings 48. At this time, the amount of air blown out from the blowout opening 50 is so small that coldness in the air will not be felt even when the temperature of the heat exchanger 18 is relatively low.

After the fan motor 74 is run for a certain period of time, the room temperature is measured by the room temperature sensor 80 in subsequent step 210. At this time, the air newly drawn in from the interior of the room is got into around the room temperature sensor 80. Therefore, an appropriate temperature that is not affected by the remaining heat of the heat exchanger 18 can be measured.

In this way, in the air conditioner 10, as the fan motor 74 is run intermittently at minimum capability when the blowing of the air-conditioned air from the blowout opening 50 of the interior unit 12 is stopped, the room temperature sensor 80 is prevented from being affected by the temperature of the heat exchanger 18 while the blowing from the blowout opening 50 is suppressed, thereby making it possible to measure constantly the appropriate room temperature. Thus, the air-conditioning can be effected at appropriate capability based on the room temperature measured by the room temperature sensor 80, allowing the interior of the room to be kept in a comfortable air-conditioned state.

The present embodiment was described by taking the example of the heating mode where the room temperature sensor 80 is affected most by the temperature of the heat exchanger 18. However, it may be effected in other run modes such as a cooling mode.

Further, in the present embodiment, the fan motor 74 is driven intermittently, and when the fan motor 74 is stopped, the room temperature is measured by the room temperature sensor 80 disposed between the inlet openings and the heat exchanger. However, as the intermittent driving of the fan motor 74 can prevent the temperature of the air around the room temperature sensor 80 from being affected by the temperature of the heat exchanger 18, the room temperature may be measured by the room sensor temperature 80 in predetermined timing, which is independent of the timing of the intermittent driving of the fan motor 74.

In addition, in the present embodiment, the fan motor 74 is driven for 5 seconds after the stop of 30 seconds. However, the interval between each run of the fan motor 74 and the duration of each run thereof can be set freely.

In the present embodiment, the air conditioner 10 that is a separate type and drives the compressor 26 at a constant speed is given as an example for description. However, the present invention can be applied to any air conditioner having a structure wherein the temperature sensor for detecting the room temperature is provided between the inlet openings 48 and the heat exchanger 18.

As described above, according to the present invention, an appropriate room temperature that is not affected by the temperature of the heat exchanger even when the blowing is stopped can be measured by the temperature sensor disposed between the inlet openings and the heat exchanger. Thus, excellent effects can be obtained in that, for example, during the heating, coldness is not felt in the air even when the compressor is stopped and an air-conditioning can be effected so as to provide an appropriate air-conditioned state in the room.

What is claimed is:

1. An internal unit for an air-conditioning apparatus, said internal unit provided for cooling or heating air in a room, comprising:

a heat exchanger for radiating heat to or absorbing heat from air around the heat exchanger when a refrigerant circulates through the heat exchanger;

one or more inlet openings through which air comes from the room into the internal unit;

one or more outflow openings through which air goes out from the internal unit to the room;

a blower for blowing air from the inlet openings to the outflow openings through the heat exchanger;

a temperature sensor located between the inlet openings and the heat exchanger;

a blower controller for controlling the blower at least at normal capacity and at minimum capacity where the blower is activated at predetermined time intervals; and a room temperature monitor programmed to measure a room temperature with the temperature sensor during operation of the blower at normal capacity, and to measure the room temperature with the temperature sensor upon stopping of the blower when the blower is at minimum capacity.

2. An internal unit according to claim 1, wherein said room temperature monitor operates the blower controller to activate the blower at the predetermined time intervals during heating.

3. An internal unit according to claim 1, wherein said room temperature monitor operates the blower controller to activate the blower at the predetermined time intervals, and detects the room temperature with the temperature sensor immediately after the blower stops.

4. An internal unit according to claim 1, further comprising a heat exchanger temperature sensor for detecting a temperature of the internal heat exchanger, wherein the room temperature monitor operates the blower controller to inactivate the blower until the temperature of the internal heat exchanger rises to a first predetermined temperature during heating.

5. An internal unit according to claim 4, wherein said room temperature monitor operates the blower controller to operate the blower at minimum capacity until the temperature of the internal heat exchanger rises to a second predetermined temperature that is higher than the first predetermined temperature.

6. A method for conditioning air in a room using an internal unit for an air-conditioning apparatus, said internal unit provided in the room and comprising: (a) a heat exchanger for radiating heat to or absorbing heat from air around the heat exchanger when a refrigerant circulates through the heat exchanger; (b) one or more inlet openings through which air comes from the room into the internal unit; (c) one or more outflow openings through which air goes out from the internal unit to the room; and (d) a blower for blowing air from the inlet openings to the outflow openings through the heat exchanger, said method comprising the steps of:

measuring a room temperature between the inlet openings and the heat exchanger;

controlling the blower at minimum capacity where the blower is activated at predetermined time intervals when the room temperature is lower than a predetermined temperature for heating or when the room temperature is higher than a predetermined temperature for cooling;

measuring the room temperature between the inlet openings and the heat exchanger upon stopping of the blower; and     controlling the blower at normal capacity when the room temperature is higher than a predetermined temperature for heating or when the room temperature is lower than a predetermined temperature for cooling.

7. A method according to claim 6, wherein the room temperature is measured immediately upon stopping of the blower.

8. A method according to claim 6, further comprising detecting a temperature of the internal heat exchanger, wherein the blower is at minimum capacity until the temperature of the internal heat exchanger rises to a second predetermined temperature that is higher than the first-mentioned predetermined temperature.

* * * * *